United States Patent
Song et al.

(10) Patent No.: US 11,025,446 B2
(45) Date of Patent: Jun. 1, 2021

(54) METHOD AND APPARATUS FOR GROUP COMMUNICATION IN WIRELESS COMMUNICATION SYSTEM

(71) Applicant: Samsung Electronics Co., Ltd., Suwon-si (KR)

(72) Inventors: Junhyuk Song, Anyang-si (KR); Daejoong Kim, Yongin-si (KR); Juyoung Kim, Hwaseong-si (KR); Daewoo Lee, Seoul (KR); Hyungtaig Lim, Suwon-si (KR); Minjae Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 450 days.

(21) Appl. No.: 15/183,223

(22) Filed: Jun. 15, 2016

(65) Prior Publication Data

US 2016/0366721 A1 Dec. 15, 2016

Related U.S. Application Data

(60) Provisional application No. 62/175,697, filed on Jun. 15, 2015.

(30) Foreign Application Priority Data

Jun. 29, 2015 (KR) .................. 10-2015-0092556
Sep. 4, 2015 (KR) .................. 10-2015-0125859

(51) Int. Cl.
*H04W 4/06* (2009.01)
*H04W 52/02* (2009.01)
(Continued)

(52) U.S. Cl.
CPC ............. *H04L 12/189* (2013.01); *H04W 4/06* (2013.01); *H04W 52/0225* (2013.01);
(Continued)

(58) Field of Classification Search
CPC ............. H04W 76/028; H04W 76/048; H04W 52/0225; H04W 4/06; H04W 76/28
See application file for complete search history.

(56) References Cited

U.S. PATENT DOCUMENTS 7,366,124 B2 * 4/2008 Lee .................. H04B 7/26
370/312
7,760,676 B2 7/2010 Demirhan et al.
(Continued)

FOREIGN PATENT DOCUMENTS

CN 102017726 A 4/2011
CN 102143565 A 8/2011
(Continued)

OTHER PUBLICATIONS

US 8,565,770 B2, 10/2013, Kazmi (withdrawn)
(Continued)

*Primary Examiner* — Brian D Nguyen
(74) *Attorney, Agent, or Firm* — Jefferson IP Law, LLP

(57) ABSTRACT

A method and an apparatus for group communication in a mobile communication system are provided. The method includes receiving a first message including information related to a discontinuous reception (DRX) cycle from a network device, transmitting a second message based on the first message to at least one terminal, and transmitting data to the at least one terminal based on the information related to the DRX cycle.

10 Claims, 18 Drawing Sheets

(51) Int. Cl.
*H04L 12/18* (2006.01)
*H04W 76/28* (2018.01)
*H04W 72/00* (2009.01)

(52) U.S. Cl.
CPC .......... *H04W 76/28* (2018.02); *H04W 72/005* (2013.01); *Y02D 30/70* (2020.08)

(56) References Cited

U.S. PATENT DOCUMENTS

| | | | |
|---|---|---|---|
| 7,899,003 B2 | 3/2011 | Xu | |
| 7,957,360 B2 | 6/2011 | Suzuki et al. | |
| 7,966,017 B2 | 6/2011 | Kim et al. | |
| 8,023,467 B2 | 9/2011 | Wu et al. | |
| 8,045,507 B2 | 10/2011 | Kim et al. | |
| 8,072,963 B2 | 12/2011 | Suzuki | |
| 8,103,318 B1 | 1/2012 | Suzuki | |
| 8,121,632 B2 | 2/2012 | Sambhwani et al. | |
| 8,169,957 B2 | 5/2012 | Damnjanovic | |
| 8,195,164 B2 | 6/2012 | Kazmi | |
| 8,219,119 B2 | 7/2012 | Kuo | |
| 8,228,829 B2 * | 7/2012 | Sammour | H04W 52/0216 370/311 |
| 8,238,260 B2 | 8/2012 | Terry et al. | |
| 8,249,004 B2 | 8/2012 | Wang et al. | |
| 8,265,682 B2 | 9/2012 | Bertrand et al. | |
| 8,310,919 B2 * | 11/2012 | Worrall | H04W 72/005 370/229 |
| 8,320,287 B2 | 11/2012 | Cai et al. | |
| 8,351,922 B2 | 1/2013 | Wang et al. | |
| 8,363,611 B2 | 1/2013 | Ho et al. | |
| 8,374,097 B2 | 2/2013 | Guiriec et al. | |
| 8,374,617 B2 | 2/2013 | Tseng | |
| 8,423,036 B2 | 4/2013 | Ahluwalia | |
| 8,447,369 B2 | 5/2013 | Suzuki | |
| 8,451,803 B2 | 5/2013 | Kitazoe | |
| 8,462,803 B2 | 6/2013 | Susitaival et al. | |
| 8,483,624 B2 | 7/2013 | Cai et al. | |
| 8,488,521 B2 | 7/2013 | Wang et al. | |
| 8,526,377 B2 | 9/2013 | Lindoff et al. | |
| 8,554,251 B2 | 10/2013 | Bhattacharjee et al. | |
| 8,583,131 B2 | 11/2013 | Ahluwalia | |
| 8,626,167 B2 | 1/2014 | Futaki et al. | |
| 8,660,575 B2 | 2/2014 | Fischer | |
| 8,688,119 B2 | 4/2014 | Sagfors et al. | |
| 8,693,381 B2 | 4/2014 | Zhang et al. | |
| 8,711,809 B2 | 4/2014 | Wu et al. | |
| 8,724,547 B2 | 5/2014 | Xu | |
| 8,743,764 B2 | 6/2014 | Chen et al. | |
| 8,755,313 B2 | 6/2014 | Damnjanovic et al. | |
| 8,755,316 B2 | 6/2014 | Aschan et al. | |
| 8,761,813 B2 * | 6/2014 | Gao | H04W 68/00 370/310 |
| 8,792,919 B2 | 7/2014 | Koskela | |
| 8,797,924 B2 | 8/2014 | Tseng et al. | |
| 8,798,615 B2 | 8/2014 | Levy et al. | |
| 8,804,546 B2 | 8/2014 | Tenny et al. | |
| 8,804,665 B2 | 8/2014 | Kim et al. | |
| 8,811,252 B2 * | 8/2014 | Maeda | H04L 5/0007 370/312 |
| 8,849,215 B2 | 9/2014 | Edara | |
| 8,861,384 B2 | 10/2014 | Chin et al. | |
| 8,868,026 B2 | 10/2014 | Dhomeja | |
| 8,874,116 B2 | 10/2014 | Kazmi | |
| 8,913,536 B2 | 12/2014 | Futaki et al. | |
| 8,929,898 B2 | 1/2015 | Kazmi | |
| 8,971,933 B2 | 3/2015 | Kitazoe et al. | |
| 8,995,259 B2 | 3/2015 | Paredes et al. | |
| 9,014,032 B2 | 4/2015 | Terry et al. | |
| 9,036,502 B2 | 5/2015 | Tenny et al. | |
| 9,426,743 B2 * | 8/2016 | Lee | H04W 52/0229 |
| 9,883,483 B2 * | 1/2018 | Bontu | H04W 72/005 |
| 2004/0180675 A1 | 9/2004 | Choi et al. | |
| 2009/0149164 A1 | 6/2009 | Cai | |
| 2009/0247203 A1 | 10/2009 | Kuo | |
| 2010/0020755 A1 | 1/2010 | Tseng | |
| 2010/0208660 A1 | 8/2010 | Ji | |
| 2010/0255835 A1 | 10/2010 | Suzuki et al. | |
| 2010/0272004 A1 | 10/2010 | Maeda et al. | |
| 2010/0330992 A1 | 12/2010 | Bhattacharjee et al. | |
| 2011/0217973 A1 | 9/2011 | Sagfors et al. | |
| 2011/0228733 A1 | 9/2011 | Koo et al. | |
| 2011/0237231 A1 | 9/2011 | Horneman et al. | |
| 2011/0280221 A1 | 11/2011 | Chin et al. | |
| 2012/0069782 A1 | 3/2012 | Kuo et al. | |
| 2012/0207069 A1 | 8/2012 | Xu et al. | |
| 2012/0207070 A1 | 8/2012 | Xu et al. | |
| 2012/0243458 A1 | 9/2012 | Ai | |
| 2012/0243528 A1 | 9/2012 | Frye et al. | |
| 2013/0083712 A1 | 4/2013 | Sadek et al. | |
| 2013/0107723 A1 | 5/2013 | Dhanda et al. | |
| 2013/0128789 A1 | 5/2013 | Futaki et al. | |
| 2013/0128791 A1 | 5/2013 | Futaki et al. | |
| 2013/0194990 A1 | 8/2013 | Banister et al. | |
| 2013/0194991 A1 | 8/2013 | Vannithamby et al. | |
| 2013/0223307 A1 | 8/2013 | Ohlsson et al. | |
| 2013/0223311 A1 | 8/2013 | Wang et al. | |
| 2013/0229965 A1 | 9/2013 | Bressanelli et al. | |
| 2013/0258919 A1 | 10/2013 | Damnjanovic | |
| 2013/0265923 A1 | 10/2013 | Wang et al. | |
| 2013/0294311 A1 | 11/2013 | Cai et al. | |
| 2013/0301501 A1 | 11/2013 | Olvera-Hernandez et al. | |
| 2013/0308465 A1 | 11/2013 | Wanstedt et al. | |
| 2013/0308507 A1 | 11/2013 | Wanstedt et al. | |
| 2013/0308511 A1 | 11/2013 | Ljung | |
| 2013/0336186 A1 | 12/2013 | Damnjanovic | |
| 2014/0022909 A1 | 1/2014 | Mahmoud et al. | |
| 2014/0073306 A1 | 3/2014 | Shetty et al. | |
| 2014/0086208 A1 | 3/2014 | Murray et al. | |
| 2014/0105087 A1 | 4/2014 | Gupta et al. | |
| 2014/0112271 A1 | 4/2014 | Pan | |
| 2014/0126400 A1 | 5/2014 | Chhabra et al. | |
| 2014/0133374 A1 | 5/2014 | Frye | |
| 2014/0161007 A1 | 6/2014 | Donthi et al. | |
| 2014/0161017 A1 | 6/2014 | Lee et al. | |
| 2014/0161075 A1 | 6/2014 | Xu | |
| 2014/0194125 A1 | 7/2014 | Wen et al. | |
| 2014/0198701 A1 | 7/2014 | Ostergaard et al. | |
| 2014/0204817 A1 | 7/2014 | Ekici et al. | |
| 2014/0273872 A1 | 9/2014 | Levy et al. | |
| 2014/0274038 A1 | 9/2014 | Singhal et al. | |
| 2014/0286215 A1 | 9/2014 | Koc et al. | |
| 2014/0301261 A1 | 10/2014 | Godor et al. | |
| 2014/0301373 A1 | 10/2014 | Cili et al. | |
| 2014/0328289 A1 | 11/2014 | Kim et al. | |
| 2014/0355473 A1 | 12/2014 | Edara | |
| 2014/0362754 A1 | 12/2014 | Moses et al. | |
| 2015/0029920 A1 | 1/2015 | Hoehne et al. | |
| 2015/0043481 A1 | 2/2015 | Mucke et al. | |
| 2015/0055448 A1 * | 2/2015 | Lee | H04B 7/26 370/216 |
| 2015/0078189 A1 | 3/2015 | Kwon et al. | |
| 2015/0078349 A1 | 3/2015 | He et al. | |
| 2015/0098379 A1 | 4/2015 | Lunden et al. | |
| 2015/0117231 A1 | 4/2015 | Yang et al. | |
| 2015/0117284 A1 | 4/2015 | Baldemair et al. | |
| 2015/0124674 A1 | 5/2015 | Jamadagni et al. | |
| 2015/0282132 A1 * | 10/2015 | Kim | H04W 8/005 370/329 |
| 2015/0341858 A1 * | 11/2015 | Hwang | H04W 52/0225 370/311 |
| 2017/0181062 A1 * | 6/2017 | Kim | H04W 48/10 |
| 2017/0251519 A1 * | 8/2017 | Ohlsson | H04W 76/28 |

FOREIGN PATENT DOCUMENTS

| | | |
|---|---|---|
| CN | 103401668 A | 11/2013 |
| CN | 103957581 A | 7/2014 |

(56) References Cited

FOREIGN PATENT DOCUMENTS

EP      2 234 420 A1    9/2010
EP      2 469 953 A1    6/2012

OTHER PUBLICATIONS

NEC, Update to eDRX in idle mode solution, S2-151921, SA WG2 Meeting #109, Fukuoka, Japan, May 29, 2015, See pp. 2-4 and fig. 5.1.1.1.-1.
Ericsson et al., Extended DRX in Idle, S2-152102, SA WG2 Meeting #109, Fukuoka, Japan, May 29, 2015, See pp. 2-5 and fig. 5.2.1.2.1-2.
Chinese Office Action dated Aug. 14, 2020, issued in Chinese Application No. 201680034821.4.
Chinese Office Action dated Mar. 24, 2021, issued in Chinese Application No. 201680034821.4.

* cited by examiner

FIG. 4

| LCID 1 | Stop MTCH 1 | Oct 1 |
|---|---|---|
| Stop MTCH 1 || Oct 2 |
| LCID 2 | Stop MTCH 2 | Oct 3 |
| Stop MTCH 2 || Oct 4 |

. . .

| LCID n | Stop MTCH n | Oct 2n-1 |
|---|---|---|
| Stop MTCH n || Oct 2n |

METHOD AND APPARATUS FOR GROUP COMMUNICATION IN WIRELESS COMMUNICATION SYSTEM

CROSS-REFERENCE TO RELATED APPLICATION(S)

This application claims the benefit under 35 U.S.C. § 119(e) of a U.S. Provisional application filed on Jun. 15, 2015 in the U.S. Patent and Trademark Office and assigned Ser. No. 62/175,697, and under 35 U.S.C. § 119(a) of Korean patent applications filed on Jun. 29, 2015 and Sep. 4, 2015 in the Korean Intellectual Property Office and assigned Serial numbers 10-2015-0092556 and 10-2015-0125859, respectively, the entire disclosure of each of which is hereby incorporated by reference.

TECHNICAL FIELD

The present disclosure relates to a method and an apparatus for group communication in a wireless communication system. More particularly, the present disclosure relates to a method and an apparatus for group communication between a base station and a terminal using a multimedia broadcast/multicast service (MBMS).

BACKGROUND

In general, mobile communication systems were developed to provide a voice service while securing user's mobility. However, the mobile communication system field has expanded gradually to data services in addition to voice services, and the mobile communication system is presently capable of providing high-speed data services. However, in the mobile communication system that is currently providing a high-speed data service, since resources are short and users demand higher-speed services, there has been a need for a greatly developed mobile communication system.

On the other hand, unlike a voice service, resources that can be allocated for a data service are determined in accordance with the amount of data to be transmitted and a channel situation. Accordingly, in a wireless communication system, such as a mobile communication system, a scheduler manages allocation of transmission resources in consideration of the amount of resources to be transmitted, the channel situation, and the amount of data. Such management is performed in the same manner even in a long term evolution (LTE) system that is one of the next-generation mobile communication systems, and in this case, a scheduler that is located in a base station manages and allocates wireless transmission resources.

Recently, discussions on LTE-advanced (LTE-A) communication system which can improve a transmission speed through grafting of various new technologies on an LTE communication system have been regularized. The LTE-A system includes multimedia broadcast/multicast service (MBMS) improvement. The MBMS (in the present disclosure, it is used interchangeably with evolved MBMS (eMBMS)) is a broadcasting service that is provided through the LTE system.

The MBMS is a service for simultaneously transmitting data packets to plural users, and if the users exist in the same cell, the MBMS transmits multimedia data to the respective users in the cell based on internet protocol (IP) multicast. As described above, in order to transmit the multimedia data, the MBMS enables respective cells to share necessary resources, and thus the plural users can receive the same multimedia data.

In particular, in order to make it possible to perform one-to-many group communication regardless of the number of public safety network terminals located in a cell in a public safety network, group communication that is used in LTE communication supports downlink broadcasting communication (eMBMS).

According to the downlink eMBMS transmission service of the LTE communication that is used in the public safety network, the sampling cycle of a transmitted audio signal is short (e.g., in the unit of 20 ms), and thus a multicast channel scheduling period (MSP) should be scheduled in short periods. In this case, the terminal should continuously monitor radio frames, and this may cause battery power consumption of the terminal to be increased.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for a base station that performs group communication with a terminal through multimedia broadcast/multicast service (MBMS) to transmit data to the terminal based on a set discontinuous reception (DRX) cycle and a method for a terminal to monitor scheduling information based on the DRX cycle and to receive data.

In accordance with an aspect of the present disclosure, a method of a base station to perform group communication in a mobile communication system is provided. The method includes receiving a first message that includes information related to a DRX cycle from a network device, transmitting a second message based on the first message to at least one terminal, and transmitting data to the at least one terminal based on the information related to the DRX cycle.

In accordance with another aspect of the present disclosure, a method of a network device to support group communication in a mobile communication system is provided. The method includes transmitting a first message that includes information related to a DRX cycle to a base station, wherein the information related to the DRX cycle is used for the base station to broadcast data to a terminal.

In accordance with another aspect of the present disclosure, a method of a terminal to perform group communication in a mobile communication system is provided. The method includes receiving a first message that includes information related to a DRX cycle from a base station, and discontinuously receiving data from the base station based on the information related to the DRX cycle.

In accordance with another aspect of the present disclosure, a base station for group communication in a mobile communication system is provided. The base station includes a transceiver configured to transmit and receive a signal, and a controller configured to receive a first message that includes information related to a DRX cycle from a network device, transmit a second message based on the first message to at least one terminal, and transmit data to the at least one terminal based on the information related to the DRX cycle.

In accordance with another aspect of the present disclosure, a network device that supports group communication in a mobile communication system is provided. The network device includes a transceiver configured to transmit and receive a signal, and a controller configured to transmit a first message that includes information related to a DRX cycle to a base station, wherein the information related to the DRX cycle is used for the base station to broadcast data to a terminal.

In accordance with another aspect of the present disclosure, a terminal that performs group communication in a mobile communication system is provided. The terminal includes a transceiver configured to transmit and receive information, and a controller configured to receive a first message that includes information related to a DRX cycle from a base station and discontinuously receive data from the base station based on the information related to the DRX cycle.

According to the aspects of the present disclosure, even if terminals that perform group communication with a base station through an MBMS receive an MBMS service for a long time, the terminals perform DRX of the MBMS service as set by the base station, and thus battery power consumption of the terminals can be reduced.

Further, according to the aspects of the present disclosure, even if the terminals perform DRX, the base station transmits data based on the DRX cycle of the terminals, and thus there is no loss of data to cause inaccurate communication.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a diagram explaining the structure of multicast scheduling information (MSI) according to an embodiment of the present disclosure;

Throughout the drawings, it should be noted that like reference numbers are used to depict the same or similar elements, features, and structures.

DETAILED DESCRIPTION

Figure 1:
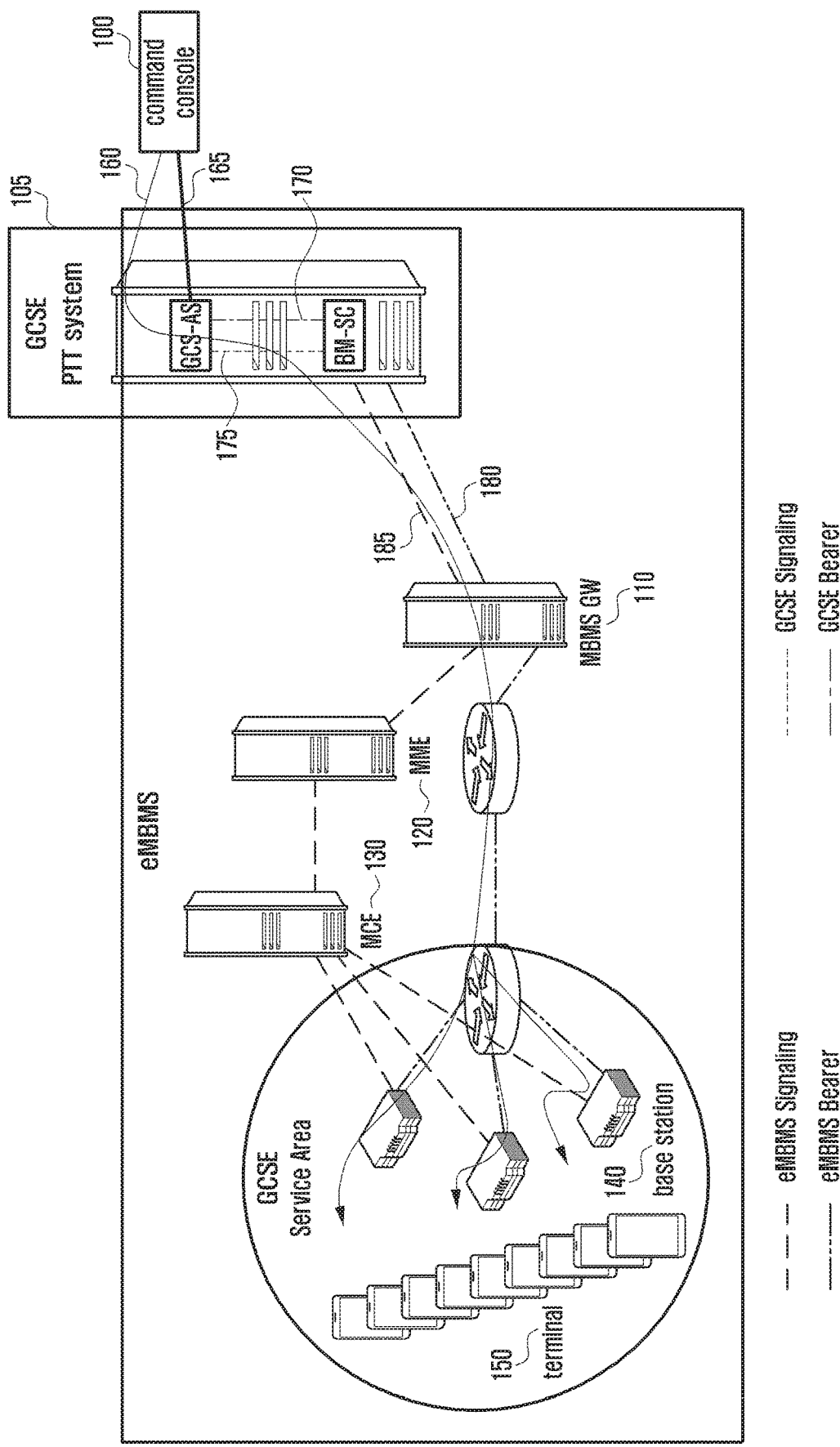
FIG. 1 is a diagram explaining group communication using an evolved multi broadcast multicast system (eMBMS) in a public safety-long term evolution (PS-LTE) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some constituent elements are exaggerated, omitted, or roughly illustrated. Further, sizes of some constituent elements may not completely reflect the actual sizes thereof. In the drawings, the same drawing reference numerals are used for the same elements across various figures.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

The present disclosure will be described herein with reference to the accompanying drawings illustrating block diagrams and flowcharts explaining a method and an apparatus for supporting facility control of a terminal according to various embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

The term "unit", as used in an embodiment, means, but is not limited to, a software or hardware component, such as a field programmable gate array (FPGA) or application specific integrated circuit (ASIC), which performs certain tasks. However, a unit does not mean that it is limited to software or hardware. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, components and units may be implemented to reproduce one or more central processing units (CPUs) in a device or a security multimedia card.

FIG. 1 is a diagram explaining group communication using an evolved multi broadcast/multicast system (eMBMS) in a public safety-long term evolution (PS-LTE) system according to an embodiment of the present disclosure.

Referring to FIG. 1, the term "PS-LTE" was first used in a public safety communications research (PSCR) in the United States, and is an LTE system that aims at transmitting data for public safety to a plurality of terminals (user equipment (UE)) using the eMBMS. A push to talk (PTT) service means that the PS-LTE system transfers instructions for the public safety to the plurality of terminals using broadcasts. The present disclosure may be used for the PS-LTE.

In an eMBMS system, an area in which the same group communication can be provided is defined as a multicast broadcast single frequency network (MBSFN) area. The SFN area is defined in the standards as a set of cells that support configuration in the same physical (PHY) layer/ media access control (MAC) layer/network. A terminal that receives an eMBMS service of LTE communication permits reception of a broadcast channel that is broadcasted to unspecified terminals, unlike the existing method for a MAC layer to provide scheduling of a physical downlink control channel (PDCCH) channel for each terminal, and a base station (evolved node B (eNB)) schedules a packet in a multicast channel scheduling period (MSP) of the broadcast channel in the MAC layer.

A PS-LTE system using the eMBMS in FIG. 1 may include a group communication service enabler (GCSE) 105, an MBMS gateway (MBMS-GW) 110, a mobility management entity (MME) 120, a multi-cell/multicast coordination entity (MCE) 130, a base station 140, and a terminal 150. The MBSFN area in the eMBMS system corresponds to a GCSE service area of FIG. 1.

The GCSE 105 may include the PTT system. Further, the GCSE 105 may include a group communication service application server (GCS-AS) and a broadcast multicast-service center (BM-SC). In the following description, a command console 100 of the public safety network transfers a message for the public safety to at least one terminal (160). First, the command console 100 transfers a message to a GCS-AS of a GCSE 105. Thereafter, the GCS-AS transmits GCSE signaling (175) through a GCSE bearer 170 connected to the GCS-AS and the BM-SC. The BM-SC that has received the GCSE signal generates an eMBMS signal (185) based on the GCSE signaling, and then the BS-SC transmits the eMBMS signal through an eMBMS bearer 180 connected to the MBMS GW 110. The eMBMS signal is transmitted to the base station 140 that is located in a GCSE service area through the MME 120 and the MCE 130. In accordance with the above-described communication method in the eMBMS system, the base station 140 may transmit the same eMBMS signal to at least one terminal 150 that is located in the GCSE service area.

Figure 2:
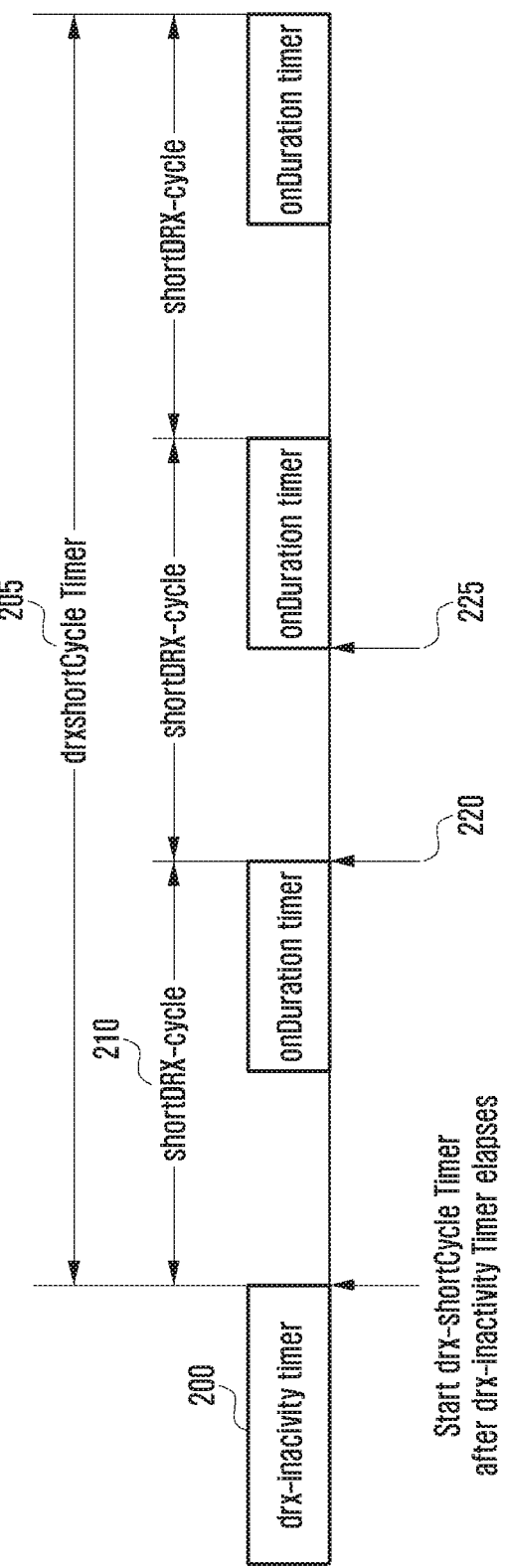
FIG. 2 is a diagram explaining a discontinuous reception (DRX) operation of a unicast terminal in an LTE system according to an embodiment of the present disclosure.

FIG. 2 is a diagram explaining a discontinuous reception (DRX) operation of a unicast terminal in an LTE system according to an embodiment of the present disclosure.

Referring to FIG. 2, in an LTE system, a packet data traffic pattern generally occurs in a manner that a lot of transmission action occurs for a predetermined time and then no transmission occurs for a long time. In consideration of this, a terminal monitors a PDCCH for only one sub-frame in the predetermined DRX cycle, and enters into a sleep state through turn-off of a reception circuit for the remaining sub-frames.

In the case of driving a drx-inactivity timer 200, the terminal confirms whether the sub-frame is a sub-frame in which data is received while monitoring the PDCCH for each sub-frame. If the data is not received in the sub-frame and a predetermined drx-inactivity time elapses, the terminal starts a drx-shortcycle timer 205. In the cycle of the drx-shortcycle timer 205, the terminal monitors the PDCCH through turn-on of the reception circuit only in an onDuration timer 220 in a predetermined shortDRX-cycle 210. If the onDuration timer ends, the terminal turns off the reception circuit again to enter into the sleep state 220, and then if the onDuration timer starts in the next shortDRX-cycle 225, the terminal turns on the reception circuit to monitor the PDCCH. Through the above-described DRX operation, the terminal can remarkably reduce power consumption of the reception circuit.

Figure 3:
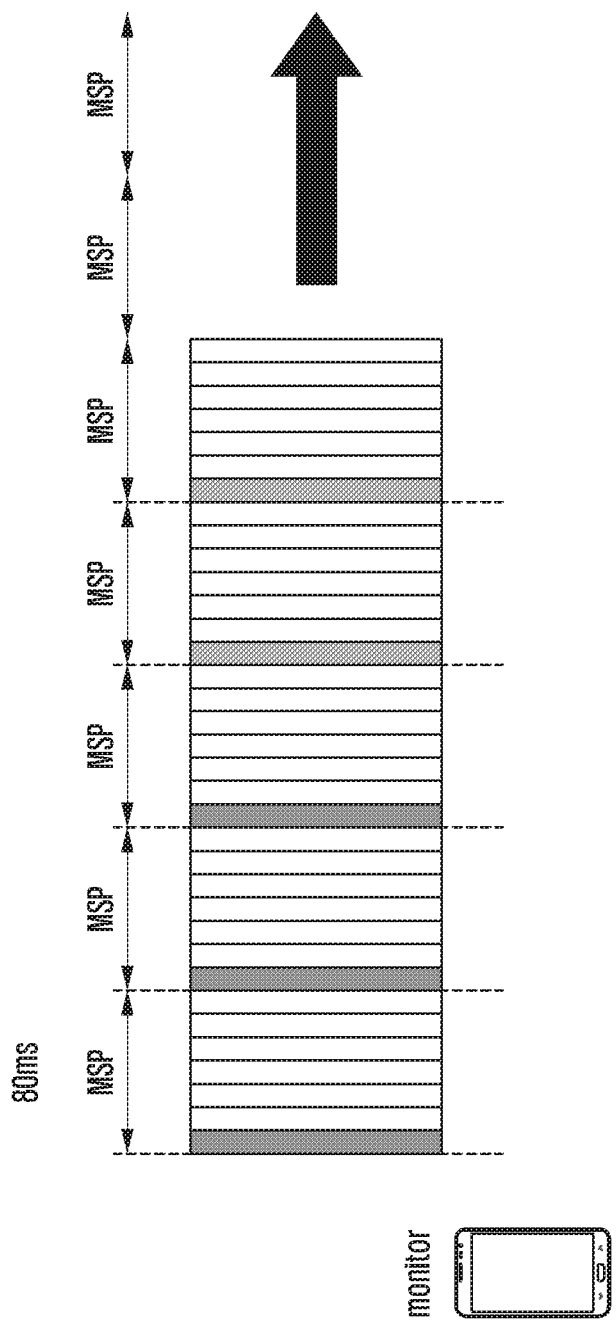
FIG. 3 is a diagram explaining how a terminal performs monitoring of channel scheduling information in accordance with 80 ms periodic continuous reception operation using an eMBMS according to an embodiment of the present disclosure.

FIG. 3 is a diagram explaining how a terminal performs monitoring of channel scheduling information in accordance with 80 ms periodic continuous reception operation using an eMBMS according to an embodiment of the present disclosure.

Referring to FIG. 3, FIG. 3 shows that the terminal monitors MCH scheduling information (MSI) for each MCH scheduling period (MSP). For example, in the case of receiving an eMBMS service in a public safety network, the terminal can continuously monitor the MSI in the MSP period of 40 ms (in case of PS-LTE) at minimum or 80 ms (in case of normal LTE).

FIG. 4 is a diagram explaining the structure of MSI according to an embodiment of the present disclosure.

Referring to FIG. 4, FIG. 4 illustrates the structure of an MSI that is a MAC protocol data unit (MAC PDU) in FIG. 3.

Using the MSI, the terminal can determine existence/nonexistence of transmitted data for a specific GCSE group to which the terminal belongs or a mission critical push to talk (MCPTT) group.

Figure 5:
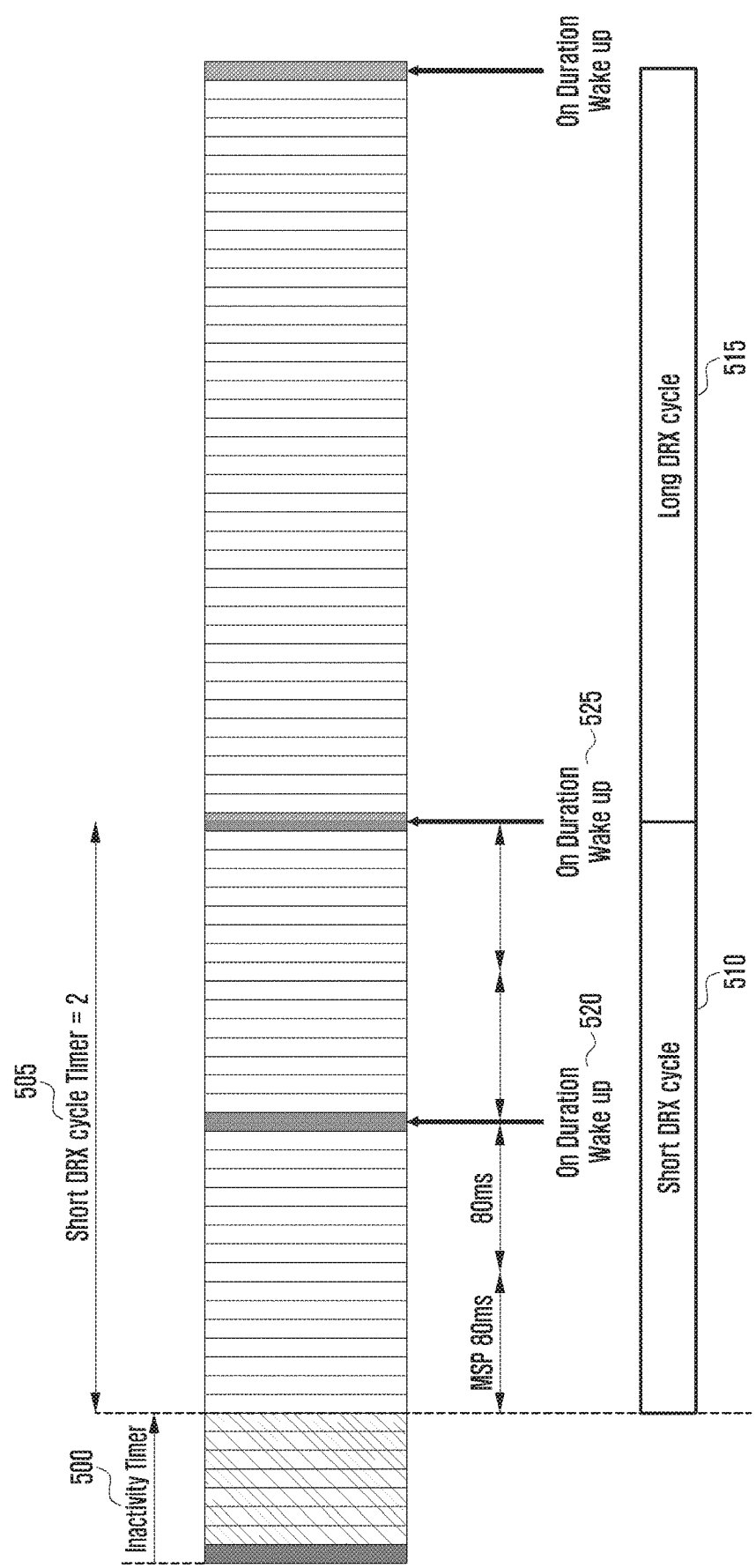
FIG. 5 is a diagram explaining data reception using a DRX operation in the case where a terminal uses an eMBMS according to an embodiment of the present disclosure.

FIG. 5 is a diagram explaining data reception using a DRX operation in the case where a terminal uses an eMBMS according to an embodiment of the present disclosure.

Referring to FIG. 5, FIG. 5 illustrates that the terminal receives data using the DRX operation in the case where the terminal uses an eMBMS.

The terminal that performs a DRX operation according to a predetermined timer receives data through monitoring of the MSI. The above-described timer may include at least one of an inactivity timer and a short DRX cycle timer.

In the present disclosure, in accordance with the setting of the timer for DRX of the terminal, two methods will be described as follows.

First method: a method in which the terminal sets the timer for itself

Second method: a method in which the timer of the terminal is set using a timer-related parameter generated in a network (e.g., MCE).

The two methods as described above have the same DRX operation of the terminal, but in the case of the second method, a base station operation and a network operation are added thereto. The operation of the terminal that is commonly applied to the first method and the second method will be described, and then the second method that is different from the first method will be described with respect to FIG. 5.

In the case where a timer for DRX is set to the terminal, the terminal observes a MAC control element of the MSI that is transmitted at the foremost portion of the MSP as described above with reference to FIG. 3 in the DRX cycle. The terminal turns off the reception circuit to enter into a sleep state with respect to the remaining MSIs that are repeatedly transmitted in the MSP period. Through this, power consumption can be remarkably reduced.

In the case of MCPPT having the features that little or very small traffic is irregularly transmitted in a long-term transmission cycle, like voice over internet protocol (VoIP), a function of transiting to a long DRX through a short DRX may be selectively used. In this case, the power consumption becomes smaller as the DRX cycle becomes longer, and thus the short DRX and the long DRX can be simultaneously supported.

The terminal can be switched to the DRX mode in accordance with the value of the inactivity timer 500. Before being switched to the DRX mode, the terminal monitors the MSI for each MSP period. The inactivity timer indicates the number of times that data that is transmitted for a specific session does not exist in the MSI that is monitored for each MSP period by the terminal. If the number of times that no data exists is equal to or larger than a predetermined number of times, the terminal may be transitioned to the DRX mode for each MSP period. The terminal can be transitioned to the DRX mode through driving of the short DRX cycle timer 505.

The short DRX is a function that is selectively applied in comparison to the long DRX. The short DRX corresponds to a method for the terminal to monitor the MSI through an even number multiple of the existing MSP before being transitioned to a relatively long DRX (e.g., 320 ms) to minimize a loss of data packets due to the long DRX. The terminal operates in the short DRX and long DRX cycles as in the following Equation 1.

$$\text{Short DRX=SFN Modulo MSP Period*Short Duration Timer=0 SFN=system frame number} \quad \text{Equation 1}$$

The terminal monitors the MSI value of the SFN only in the case where the modulo operation value for a multiple of the SFN, the MSP period, and the short duration timer value becomes "0".

An example of FIG. 5 will be described as follows. It is assumed that the MSP is 80 ms and the value of the short duration timer is "2". In this case, the terminal turns on the reception circuit in the reception cycle of 160 ms as expressed in the Equation 1 (520 and 525). The terminal can monitor the MSI value of the MSP in the frame in which the reception circuit is turned on. Further, if it is assumed that the predetermined short DRX cycle timer value is "2", the terminal can be transitioned to the long DRX cycle in the case where data is not transmitted to the MSI value in two times reception cycle (on duration wakeup). The operation in the long DRX cycle is determined as in Equation 2.

After the terminal is transitioned from the short DRX cycle 510 to the long DRX cycle 515, the reception cycle (on duration wakeup) in the long DRX is determined as in Equation 2.

$$\text{Long DRX} = \text{SFN Modulo MSP Period} * \text{Long Duration Timer} = 0 \quad \text{Equation 2}$$

Here, the long duration timer value may be set as a relatively large even number multiple. An example of FIG. 5 will be described as follows. If the MSP is 80 ms and the long duration timer value is "4", the terminal turns on the reception circuit for the reception cycle (on duration wakeup) of 320 ms. The terminal may monitor the MSI value of the MSP in the frame in which the reception circuit is turned on. If transmitted data exists in the MSI in the predetermined reception cycle (on duration wakeup), the terminal is transitioned from the DRX mode to the normal mode to newly re-determine the inactivity timer.

Figure 6:
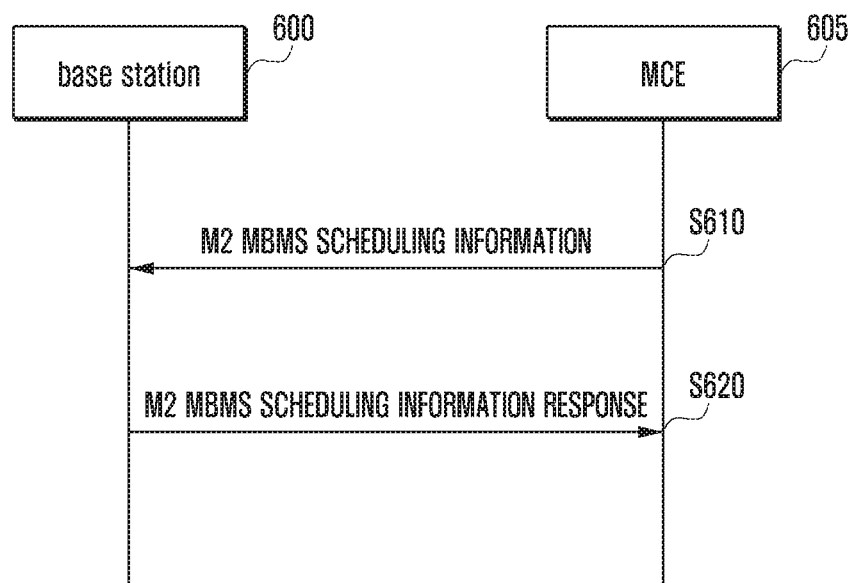
FIG. 6 is a diagram explaining signals transmitted and received between a base station and a multi-cell/multicast coordination entity (MCE) according to an embodiment of the present disclosure.

FIG. 6 is a diagram explaining signals transmitted and received between a base station and an MCE according to an embodiment of the present disclosure.

Referring to FIG. 6, FIG. 6 explains a second method for the terminal to set a timer using a timer-related parameter that is generated in the above-described network (e.g., MCE). The second method includes the same terminal DRX operation as the terminal operation of the first method, but a base station operation and a network operation are added thereto. In the second method, the base station operates in short DRX and long DRX modes that are synchronized with all terminals that receive the eMBMS session in the same MBSFN area.

The base station predicts the reception cycle (on duration wakeup) of the short DRX that is set to the terminal in the same MBSFN area and the reception cycle (on duration wakeup) of the long DRX, temporarily stores data to be transmitted to the MSP in a buffer without being discarded so that the terminal can receive the data later, and then transmits the stored packet to the next transmittable MSP.

As described above, according to the second method for the terminal to set a timer using the timer-related parameter that is generated in the network (e.g., MCE), the MCE 605 transmits an M2 MBMS scheduling information message to the base station 600 in operation S610. The base station 600 transmits an M2 MBMS scheduling information response message in response to this in operation S620.

The MBMS scheduling information message that is received by the base station 600 includes parameter values that are required for the DRX operation. The MCE transmits a parameter that is newly added to the M2 MBMS scheduling information message to the base station. The necessary message parameters are indicated as in Table 1.

TABLE 1

| IE/Group Name | Presence | Range | IE type and reference | Semantics description |
|---|---|---|---|---|
| DRX Inactivity Timer | ○ | | ENUMERATED {n1, n2, n3, n4, n5, n6, n7, n8} | Encoded as the drx-InactivityTimer-r13 IE in TS 36.331 [11]. |
| Short duration timer | ○ | | ENUMERATED {n2, n4, n8} | Encoded as the short-duration-timer-r13 IE in TS 36.331 [11]. |
| Long duration timer | ○ | | ENUMERATED {n16, n32, n64}, | Encoded as the long-duration-timer-r13 IE in TS 36.331 [11]. |
| Short DRX Cycle Timer | ○ | | ENUMERATED {n2, n4, n8, n16, n32} | Encoded as the short-drx-cycle-timer-r13 |

DRX Inactive Timer: indicates the number of MSI counts in which data is not transmitted and which becomes a reference when the terminal is transitioned from the existing normal operation to the short DRX. For example, the number may be an integer of {n1, n2, n3, n4, n5, n6, n7, n8}.

Short DRX Cycle Timer: indicates the number of reception cycle (on duration wakeup) counts in which data is not transmitted and which becomes a reference when the terminal is transitioned from the short DRX to the long DRX. For example, the number may be an integer of {n2, n4, n8, n16}.

Short Duration timer: indicates a value that determines the reception cycle (on duration wakeup) in the short DRX cycle of the terminal, and is used as a multiple value of the MSP in the form of the doubled MSP. For example, the value may be an integer of {n2, n4, n8}.

Long Duration timer: indicates a value that determines the reception cycle (on duration wakeup) in the long DRX cycle of the terminal, and is used as a multiple value of the MSP in the form of the doubled MSP. For example, the value may be an integer of {n16, n32, n64}.

Figure 7:
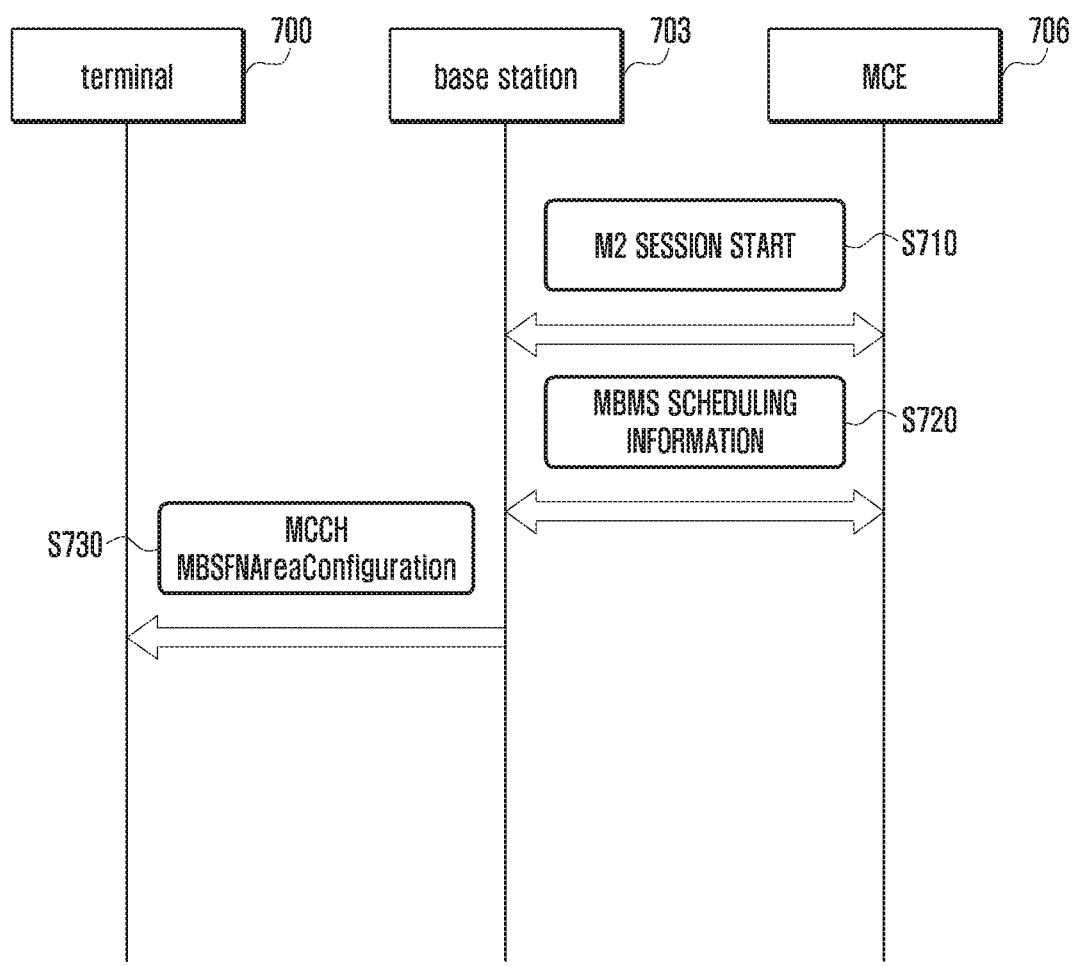
FIG. 7 is a diagram explaining the whole call process in which a session of eMBMS between a terminal, a base station, and an MCE starts according to an embodiment of the present disclosure.

FIG. 7 is a diagram explaining the whole call process in which a session of eMBMS between a terminal, a base station, and an MCE starts according to an embodiment of the present disclosure.

Referring to FIG. 7, whole call process is explained in which a session of an eMBMS starts (i.e., the procedure of transferring DRX-related parameters to the terminal).

At operation S710, an MCE 706 may notify a base station 703 of the start of an eMBMS session through an M2 session start message. Thereafter, at operation S720, the MCE may transfer information on allocation of wireless resources to the session in the same MBSFN area and parameter values required for short DRX and long DRX operations to the base station through an M2 MBMS scheduling information message.

Thereafter, at operation S730, the base station adds the parameter value included in the M2 scheduling information message received at operation S730 and the DRX indicator value indicating whether the DRX mode is currently applied to a radio resource control (RRC) multicast-broadcast single frequency network (MBSFN) AreaConfiguration message of a multicast control channel (MCCH), and broadcasts the message to the terminals 700 that receive the MCCH control channel in the MBSFN area.

The parameters added to the MBSFN area configuration (AreaConfiguration) message of the MCCH channel in relation to the DRX are as shown in Table 2 below. The explanation of newly defined parameters and their values are as follows.

TABLE 2

```
drx-config-r13    SEQUENCE{
   drx-InactivityTimer -r13        ENUMERATED {n1, n2, n3, n4, n5,
n6, n8, n10, n20, n30, spare5, spare4, spare3, spare2, spare1},
   short-duration-timer-r13   ENUMERATED {n2, n4, n8},
   long-duration-timer-r13    ENUMERATED {n16, n32, n64},
   short-drx-cycle-timer-r13  ENUMERATED {n2, n4, n8, n16, n32}
   DRX-Indicator-r13                  BOOLEAN
   },
```

- dRX-Inactivity Timer-r13: indicates the number of MSI counts in which data is not transmitted and which becomes a reference when the terminal is transitioned from the existing normal operation to the short DRX. For example, the number may be an integer of {n1, n2, n3, n4, n5, n6, n7, n8}.
- Short-Drx-Cycle-Timer-r13: indicates the number of reception cycle (on duration wakeup) counts in which data is not transmitted and which becomes a reference when the terminal is transitioned from the short DRX to the long DRX. For example, the number may be an integer of {n2, n4, n8, n16}.
- Short-Duration-timer-r13: indicates a value that determines the reception cycle (on duration wakeup) in the short DRX cycle of the terminal, and is used as a multiple value of the MSP in the form of the doubled MSP. For example, the value may be an integer of {n2, n4, n8}.
- Long-Duration-timer-r13: indicates a value that determines the reception cycle (on duration wakeup) in the long DRX cycle of the terminal, and is used as a multiple value of the MSP in the form of the doubled MSP. For example, the value may be an integer of {n16, n32, n64}.
- DRX-Indicator-r13: an indicator that notifies the terminal whether the DRX mode is currently proceeding. For example, it may indicate "ON" or "OFF" by "0" or "1".

Figure 8:
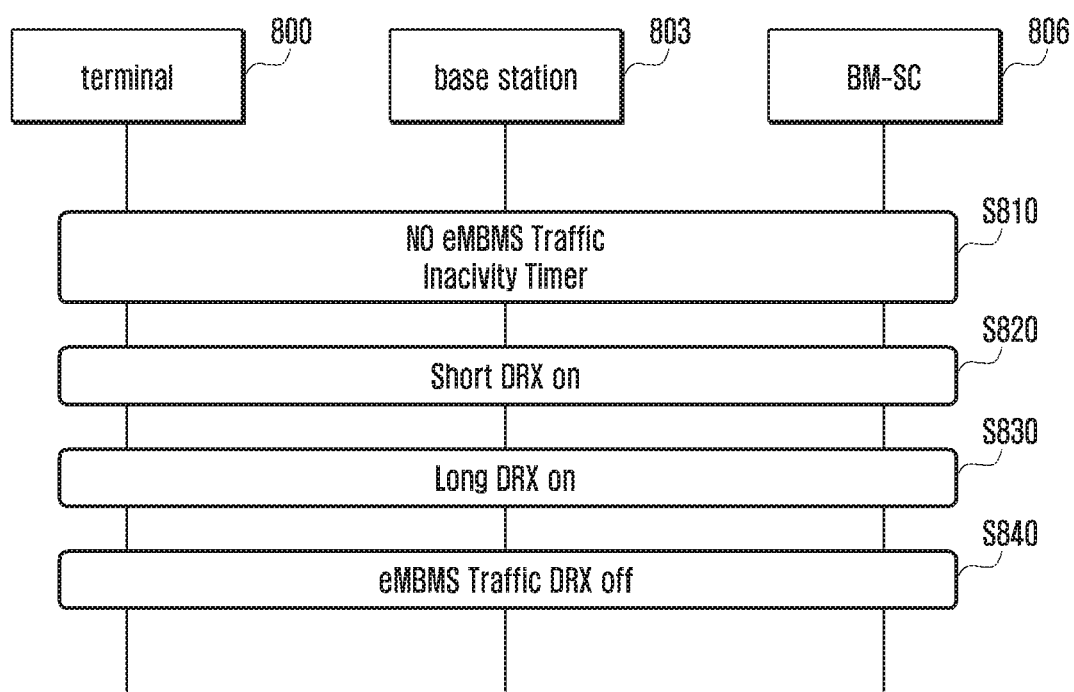
FIG. 8 is a diagram explaining a call process using DRX operation of an eMBMS between a terminal, a base station, and a broadcast multicast-service center (BM-SC) according to an embodiment of the present disclosure.

FIG. 8 is a diagram explaining a call process using DRX operation of an eMBMS between a terminal, a base station, and a BM-SC 806 according to an embodiment of the present disclosure.

Referring to FIG. 8, as described above with reference to FIG. 7, the terminal may acquire set values of drx-InactivityTimer-r13, short-drx-cycle-timer-r13, short-duration-timer-r13, short-duration-timer-r13, and DRX-Indicator-r13, which are parameters required for the DRX mode operation through decoding the drx-config-r13 message that is transmitted from an MCCH channel to a base station 803.

At operation S810, a terminal 800 may confirm the value of the MCCH message, and then may be transitioned to the long DRX in the case where the DRX-Indicator-r13 is in an on state. However, in the case where the DRX-Indicator-r13 is in an off state, the terminal 800 may operate a drx-Inactivity Timer-r13 timer and monitor the MSI value in an MSP period. In this case, if there is not data transmission in the MSI as many as the number of times set in the drx-Inactivity Timer-r13, the Inactivity timer expires, and the terminal 800 can be transitioned to the short DRX state.

At operation S820, the terminal may wake up in a determined reception cycle (short DRX on duration wakeup) while operating in a short DRX mode, and may monitor an MSI MAC control element that is transmitted at the foremost portion of the MSP. In the remaining MSIs that are repeatedly transmitted in the MSP period, the terminal turns off the reception circuit to be in a sleep state.

As described above, if there is not data transmission in the MSI as many as the number of times set in the short-drx-cycle-timer-r13 while the terminal operates in the short DRX mode, the terminal may be transitioned to a long DRX mode. At operation S830, in the long DRX mode, the terminal may wake up in a determined reception cycle (long DRX on duration wakeup), and may monitor an MSI MAC control element that is transmitted at the foremost portion of the MSP. In the remaining MSIs that are repeatedly transmitted in the MSP period, the terminal turns off the reception circuit to be in a sleep state.

As described above, the terminal may wake up in a determined cycle of the long DRX to monitor the MSI value of the MSP, and if there exists received data, the terminal may be transitioned from the long DRX mode to a normal reception mode to receive eMBMS data, and then may operate the drx-Inactivity Timer-r13 timer again. Thereafter, the terminal may return to operation S810 to repeat the above-described operations.

Figure 9:
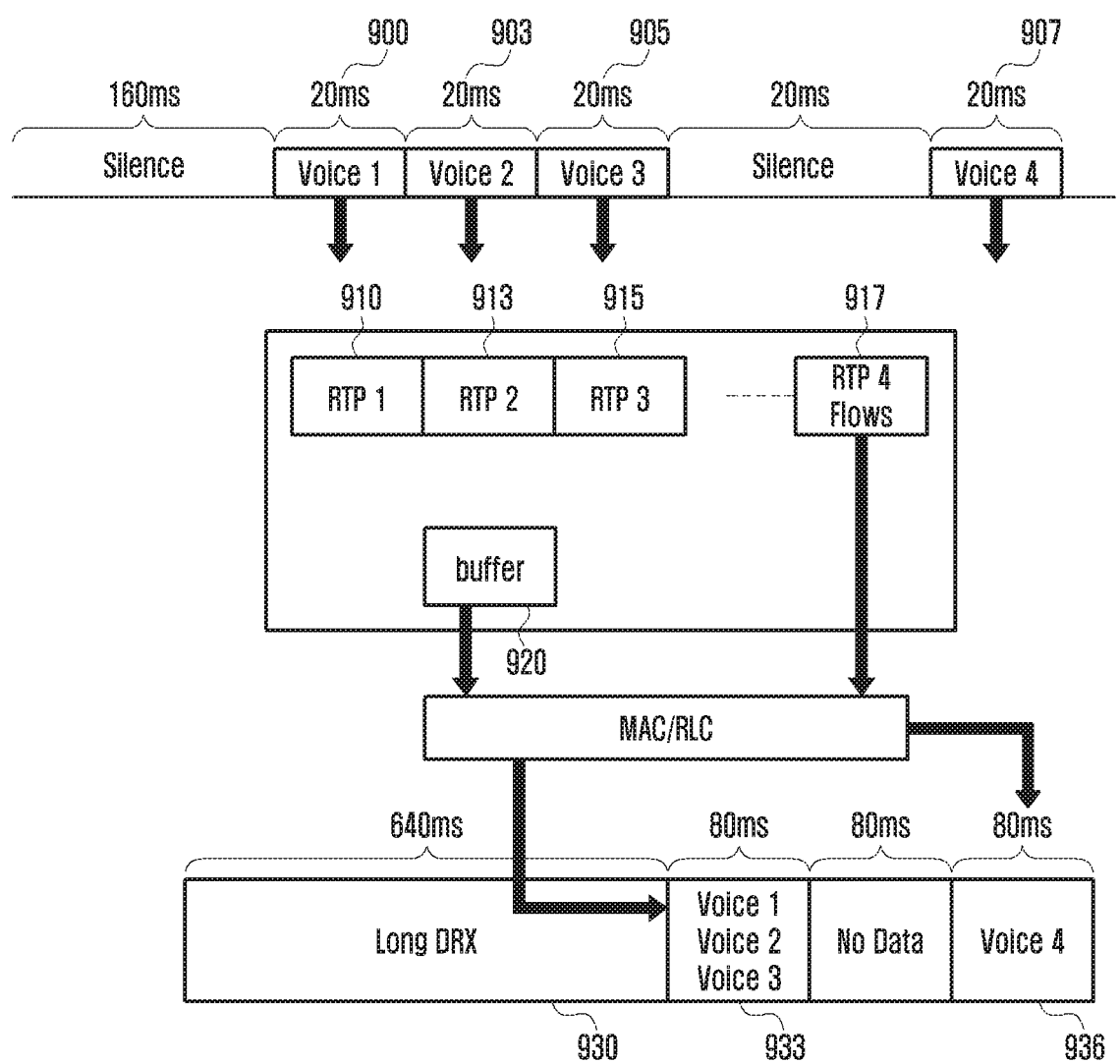
FIG. 9 is a diagram explaining how a base station supports DRX operation according to an embodiment of the present disclosure.

FIG. 9 is a diagram explaining how a base station supports DRX operation according to an embodiment of the present disclosure.

Referring to FIG. 9, FIG. 9 explains how a base station transmits stored voice packets to match the reception cycle (On Duration wakeup) of the DRX according to the DRX operation of the terminal.

In the case where the base station intends to transmit voice 1 900, voice 2 903, and voice 3 905 in the long DRX mode 930 of the terminal, the base station temporarily stores RTP 1 910, RTP 2 913, and RTP 3 915 for voice 1, voice 2, and voice 3 in a buffer 920 for the reception cycle (On duration wakeup) of the long DRX of the terminal. If the base station transmits voice 1, voice 2, and voice 3 at a time of the reception cycle (On duration wakeup) of the long DRX 930 of the terminal, the terminal can receive the voice 1, voice 2, and voice 3 through confirming of the MSI (933). Thereafter, the terminal that has received the data is transitioned to a normal reception mode, and the base station can immediately transmit voice packets to the MSP without temporarily storing the voice packets in the buffer. The base station can immediately transmit RTP 4 917 for voice 4 907 to be transmitted, and the terminal can receive the voice 4 907 through confirming of the MSI value for each MSP (936).

Figure 10:
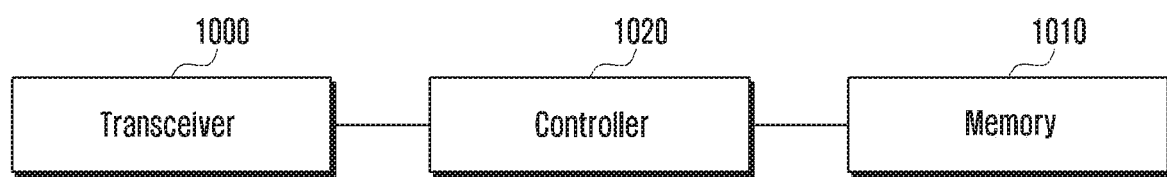
FIG. 10 is a block diagram illustrating the internal configuration of a base station according to an embodiment of the present disclosure.

FIG. 10 is a block diagram illustrating the internal configuration of a base station according to an embodiment of the present disclosure.

Referring to FIG. 10, the base station may include a transceiver 1000, a memory 1010, and a controller (e.g., processor) 1020.

The transceiver 1000 may transmit or receive information required for the operation of the base station. The transceiver 1000 may receive an M2 MBMS scheduling information message from the MCE. Further, the transceiver 1000 may receive information related to the DRX cycle that is included in the M2 MBMS scheduling information message. The information related to the DRX cycle may receive drx-Inactivity Timer-r13, short-drx-cycle-timer-r13, short-duration-timer-r13, and short-duration-timer-r13.

The transceiver 1000 may receive an MBSFNAreaConfiguration message from the terminal. The MBSFNAreaConfiguration message may include DRX-Indicator-r1 as information related to the received DRX cycle.

The memory 1010 may store information required for the operation of the base station. The memory 1010 may store information related to the DRX cycle that is received from the MCE.

The controller 1020 may operate to receive a first message that includes information related to a DRX cycle from a network device, to transmit a second message based on the first message to at least one terminal, and to transmit data to the at least one terminal based on the information related to the DRX cycle. The information related to the DRX cycle may include at least one of a DRX inactivity timer, a first period timer, a second period timer, and a first period DRX cycle timer, and the reference time of the second period timer is longer than the reference time of the first period timer.

The controller may operate to determine whether a time for transmitting first data is a reception cycle of the terminal based on the information related to the DRX cycle, to store the first data in a buffer in the case of a first time that is not the reception cycle of the terminal, and to transmit the first data stored in the buffer and second data to be transmitted at the second time to the terminal at a second time that is the reception cycle of the terminal that comes after the at least one first time. The first message includes an MBMS MSI message, and the second message includes a MBSFNAreaConfiguration message.

Figure 11:
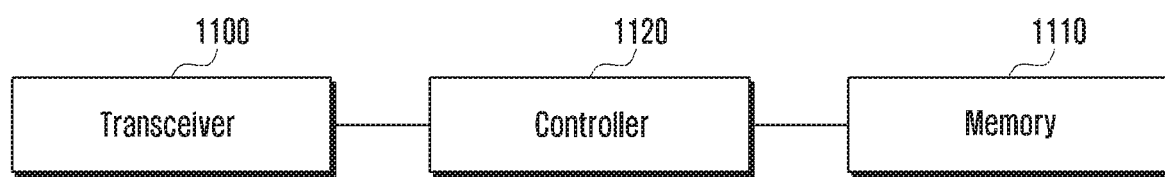
FIG. 11 is a block diagram illustrating the internal configuration of an MCE according to an embodiment of the present disclosure.

FIG. 11 is a block diagram illustrating the internal configuration of an MCE according to an embodiment of the present disclosure.

Referring to FIG. 11, the MCE may include a transceiver 1100, a memory 1110, and a controller 1120. Further, the MCE may be interchangeably used with the term "network device".

The transceiver 1100 may transmit or receive information required for the operation of the MCE. The transceiver 1100 may transmit an M2 MBMS scheduling information message that includes information for DRX of the data to the base station. Further, the transceiver 1100 may transmit information related to the DRX cycle that is included in the M2 MBMS scheduling information message. The information related to the DRX cycle may transmit drx-Inactivity Timer-r13, short-drx-cycle-timer-r13, short-duration-timer-r13, and short-duration-timer-r13.

The memory 1110 may store information required for the operation of the MCE. The memory 1110 may store information related to the DRX cycle that is received from the MCE.

The controller 1120 may operate to transmit a first message that includes information related to the DRX cycle to the base station. The information related to the DRX cycle is used for the base station to broadcast data to the terminal. The first message includes an MBMS SI message.

Figure 12:
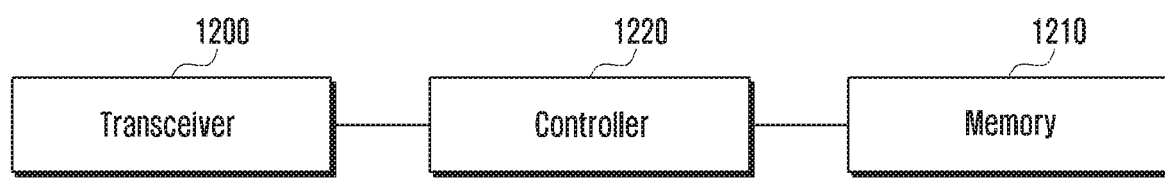
FIG. 12 is a block diagram illustrating the internal configuration of a terminal according to an embodiment of the present disclosure.

FIG. 12 is a block diagram illustrating the internal configuration of a terminal according to an embodiment of the present disclosure.

Referring to FIG. 12, the terminal may include a transceiver 1200, a memory 1210, and a controller 1220.

The transceiver 1200 may receive an MBSFNAreaConfiguration message for DRX related configuration from the base station. The MBSFNAreaConfiguration message may include DRX-Indicator-r1 r1 as information related to the DRX cycle that is received by the base station.

The memory 1210 may store information required for the operation of the MCE. The memory 1210 may store information included in the MBSFNAreaConfiguration message. The memory 1210 may transmit the stored information to the controller 1220 to be used when the terminal performs DRX operation in the eMBMS.

The controller 1220 may operate to receive a first message that includes information related to the DRX cycle from the base station and to discontinuously receive data from the base station based on the information related to the DRX cycle. The information related to the DRX cycle includes at least one of a DRX inactivity timer, a first period timer, a second period timer, a first period DRX cycle timer, and a DRX cycle indicator. The DRX cycle indicator indicates whether to proceed with the DRX cycle of the terminal at a time when the second message is received, and the reference time of the second period timer is longer than the reference time of the first period timer.

The controller 1220 may operate the DRX inactivity timer if the DRX cycle indicator indicates that the DRX cycle of the terminal does not proceed, and may operate the second period timer if the DRX cycle indicator indicates that the DRX cycle of the terminal proceeds.

The controller 1220 may operate to monitor scheduling information that is included in a second message based on the operating timer, and to receive the data from the base station based on the scheduling information.

Although preferred embodiments of the present disclosure have been described in the specification and drawings and specific wordings have been used, these are merely used as general meanings to assist those of ordinary skill in the art to gain a comprehensive understanding of the present disclosure, and do not limit the scope of the present disclosure. It will be apparent to those of ordinary skill in the art to which the present disclosure pertains that various modifications are possible on the basis of the technical concept of the present disclosure in addition to the embodiments disclosed herein.

Figure 13:
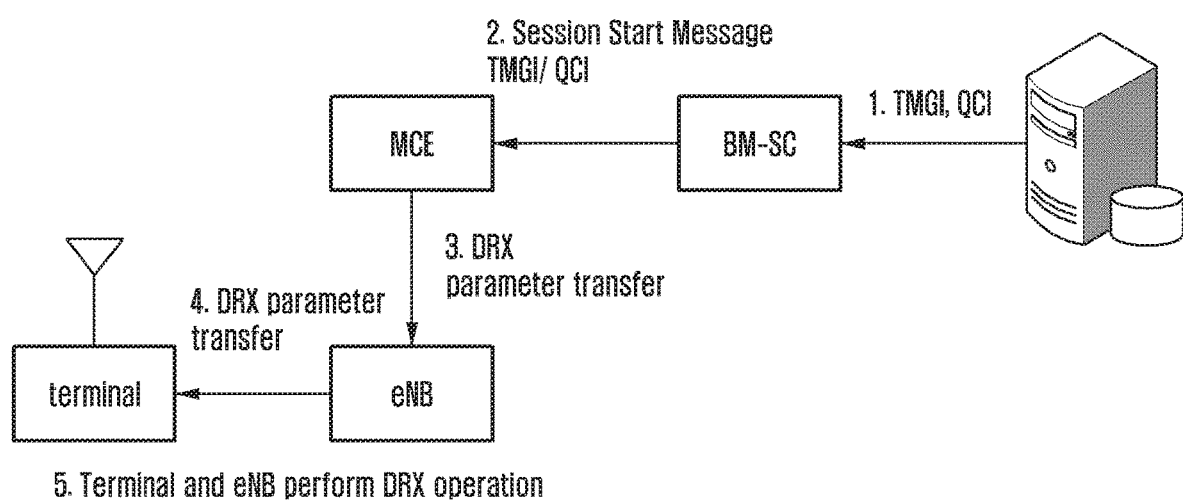
FIG. 13 is a diagram explaining a procedure in which a DRX parameter, being limited to a public safety network call, is transferred from an MCE to an evolved node B (eNB) as a session of an eMBMS between a terminal, a base station, and an MCE starts according to an embodiment of the present disclosure.

FIG. 13 is a diagram explaining a procedure in which a DRX parameter, being limited to a public safety network call, is transferred from an MCE to an eNB as a session of an eMBMS between a terminal, a base station, and an MCE starts according to an embodiment of the present disclosure. More specifically, the BM-SC can be set to the MCE using a quality of service class identifier (QCI) number whereby a call, to which the DRX should be applied in a public safety network, is defined in the standards. More specifically, the MCE transfers DRX parameter value to the eNB with respect to an eMBMS call that is set by QCI 65 and 66.

Figure 14:
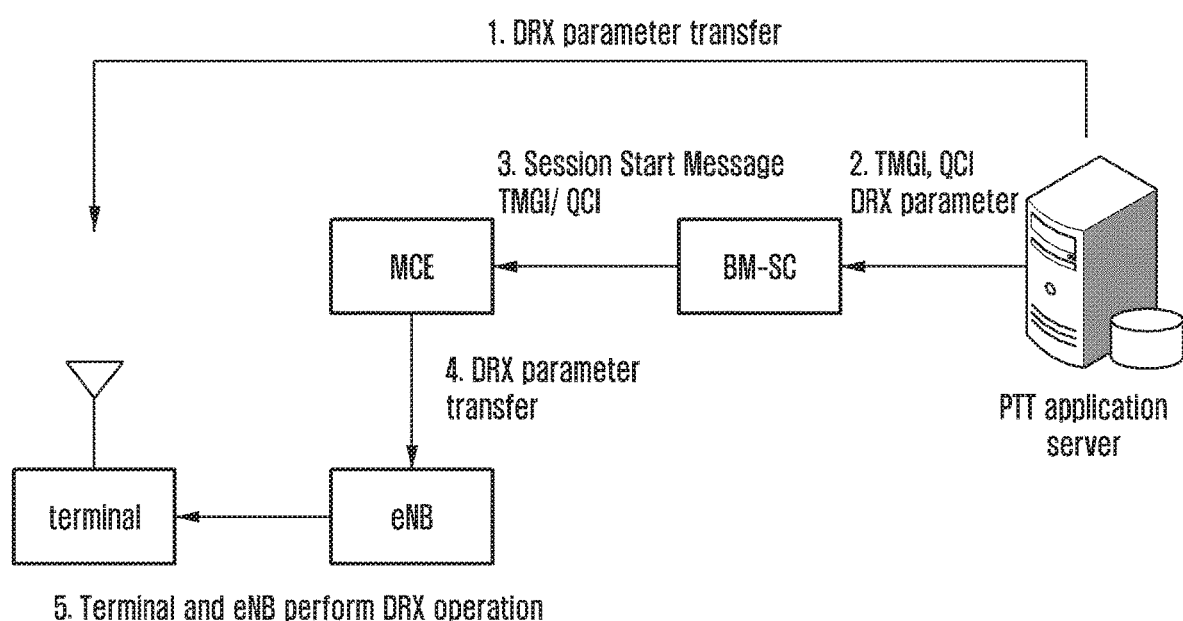
FIG. 14 is a diagram explaining a procedure in which a push to talk (PTT) server generates and transfers a DRX parameter, being limited to a public safety network call, to a terminal and an eNB as a session of an eMBMS between a terminal, a base station, and an MCE starts according to an embodiment of the present disclosure.

FIG. 14 is a diagram explaining a procedure in which a PTT server generates and transfers a DRX parameter, being limited to a public safety network call, to a terminal and an eNB as a session of an eMBMS between a terminal, a base station, and an MCE starts according to an embodiment of the present disclosure.

Referring to FIG. 14, the PTT server transfers a DRX parameter to the terminal through an application message with respect to an eMBMS call that is set by QCI 65 and 66. The PTT application server transfers the DRX parameter value to the terminal using the SDP during generation of PTT session with the UE. More specifically, the PTT application server performs the following operations.

1. The PTT application server transfers the DRX parameter value to the terminal using the SDP during generation of the PTT session with the UE.
2. The PTT application server transfers the QCI value 65 or 66 for each service and other parameter values except for the session identifier temporary mobile group identity (TMGI) to the BM-SC.
3. The BM-SC transfers the QCI value 65 or 66 for each service and other parameter values except for the session identifier TMGI to the BM-SC.
4. The MCE determines whether to apply the DRX mode to the TMGI through confirming of the QCI value, and transfers the DRX parameter to the eNB.
5. The terminal and the eNB operate with DRX parameter values set through the above-described operations 1, 2, 3, and 4.

Figure 15:
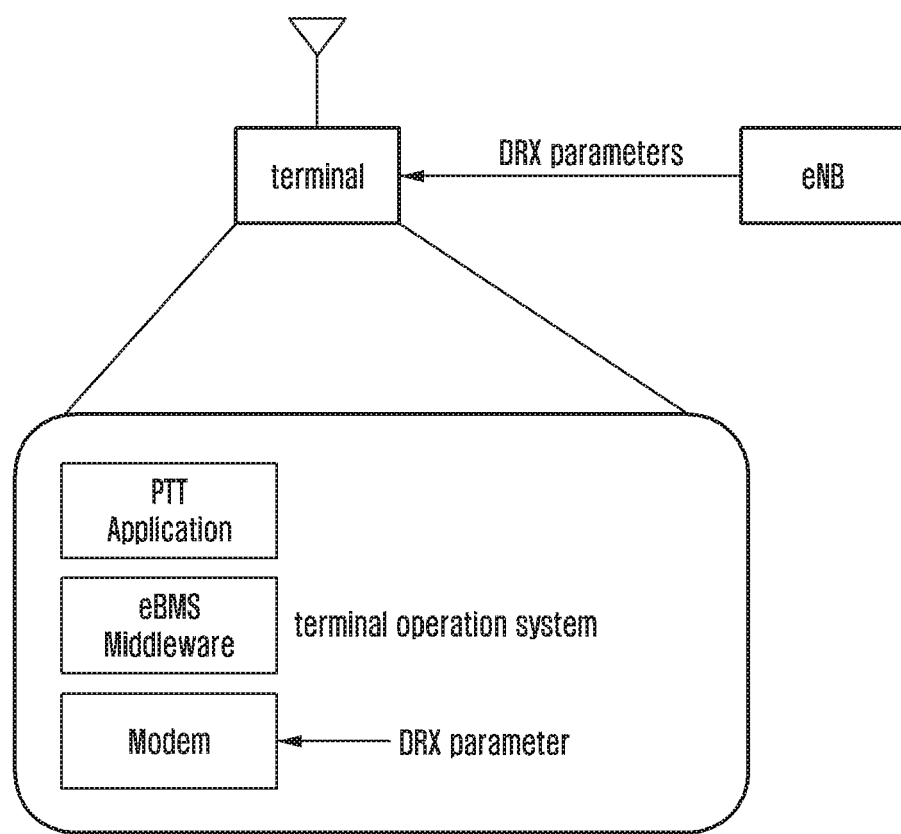
FIG. 15 is a block diagram illustrating the internal configuration of a terminal through which a modem receives a DRX parameter as an LTE message according to an embodiment of the present disclosure.

FIG. 15 is a block diagram illustrating the internal configuration of a terminal through which a modem receives a DRX parameter as an LTE message according to an embodiment of the present disclosure.

Referring to FIG. 15, the DRX parameter that is transmitted from the eNB to the MCCH message is transferred to the modem of the terminal and the modem performs the DRX operation.

Figure 16:
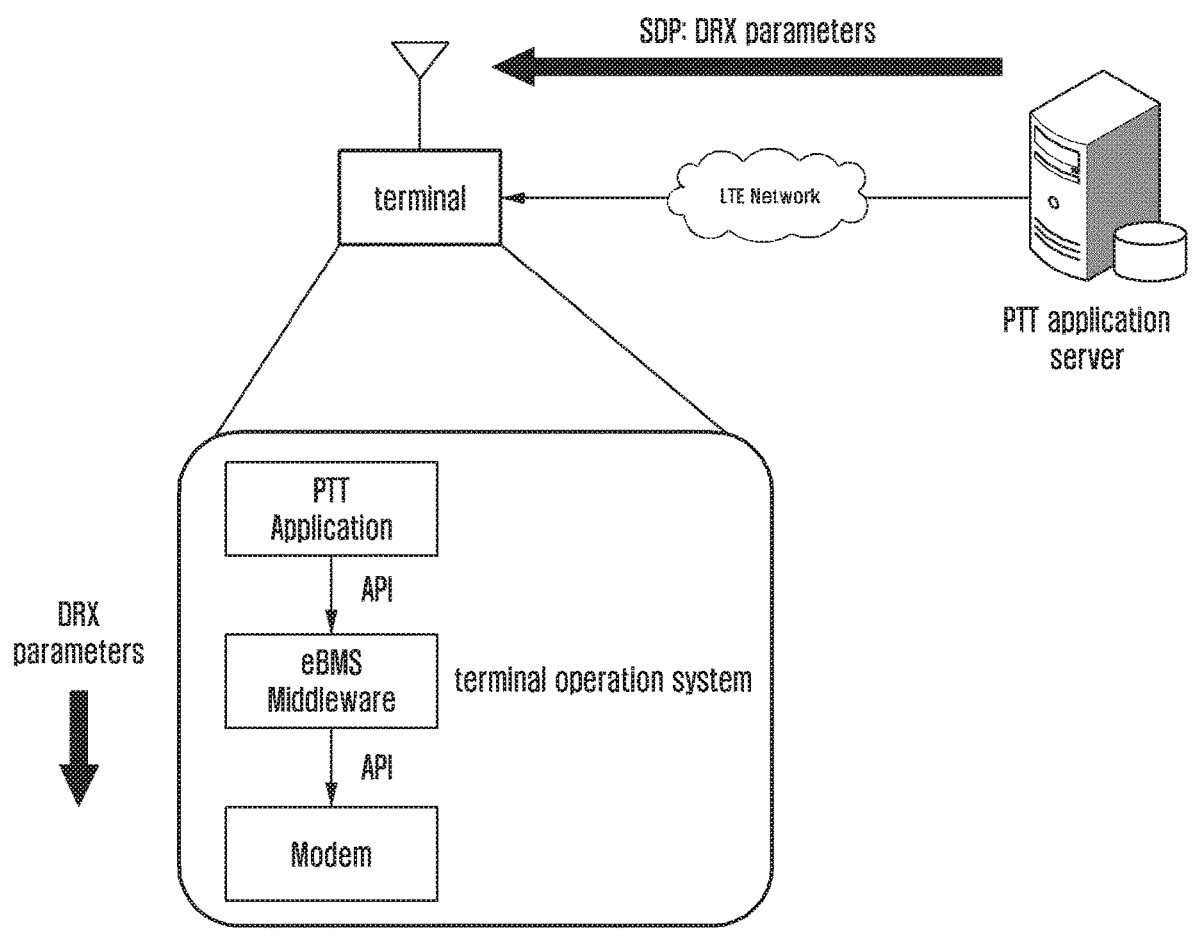
FIG. 16 is a block diagram illustrating the internal configuration of a terminal through which a PTT application of the terminal receives a DRX parameter as an upper application message and a modem under eMBMS middleware receives the DRX parameter according to an embodiment of the present disclosure.

FIG. 16 is a block diagram illustrating the internal configuration of a terminal through which a PTT application of the terminal receives a DRX parameter as an upper application message and a modem under eMBMS middleware receives the DRX parameter according to an embodiment of the present disclosure.

Referring to FIG. 16, the PTT application of the terminal receives the DRX parameter in the form of an SDP parameter, generates the DRX parameter value through a parsing work, and transfers the generated DRX parameter value to the modem of the terminal using the application program interface (API) of eMBMS middleware. The DRX parameter is transferred to the modem, and the modem performs the DRX operation.

Figure 17:
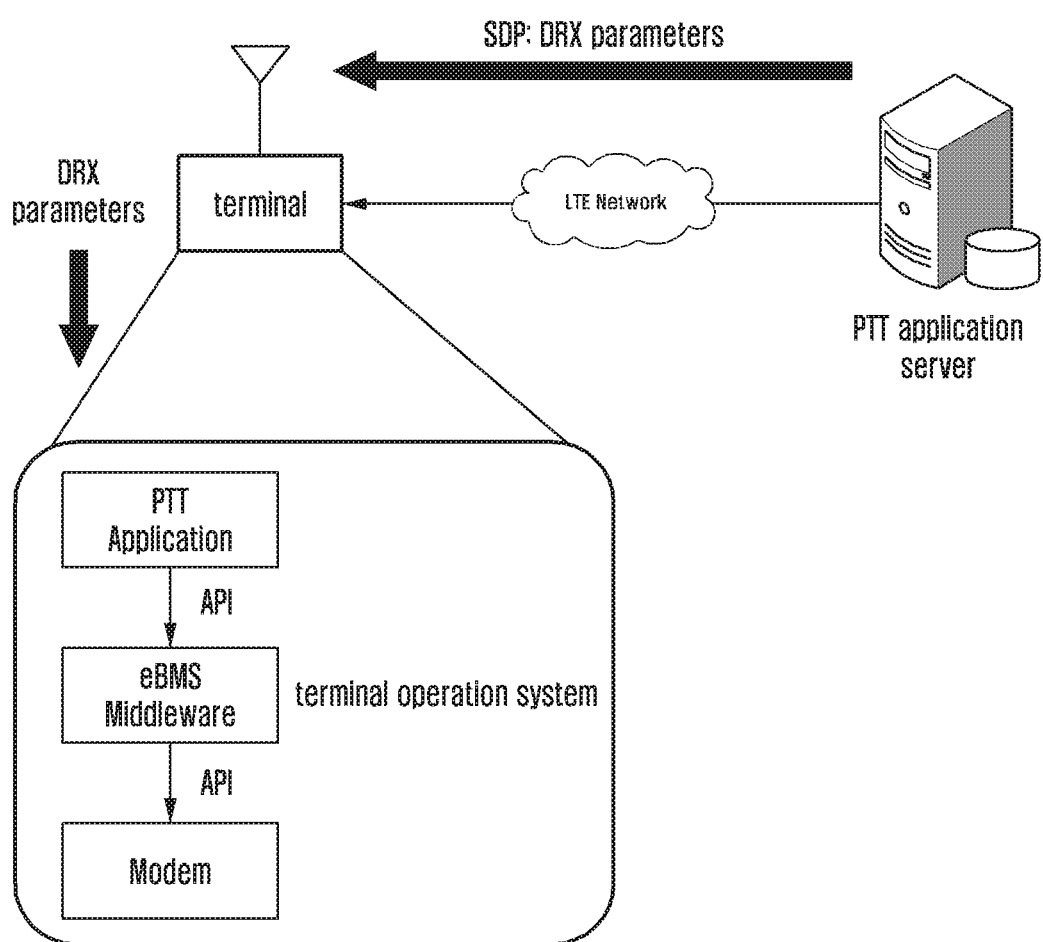
FIG. 17 is a block diagram illustrating the internal configuration of a terminal through which a PTT application of the terminal receives a DRX parameter as an upper application message and the application operates as a DRX according to an embodiment of the present disclosure.

FIG. 17 is a block diagram illustrating the internal configuration of a terminal through which a PTT application of the terminal receives a DRX parameter as an upper application message and the application operates as a DRX according to an embodiment of the present disclosure.

Referring to FIG. 17, the PTT application of the terminal receives the DRX parameter in the form of an SDP parameter, and generates the DRX parameter value by parsing the SDP parameter. The application performs DRX operation using the generated DRX parameter value. The application performs DRX determination through determining of existence/nonexistence of the received TPP packet.

Figure 18:
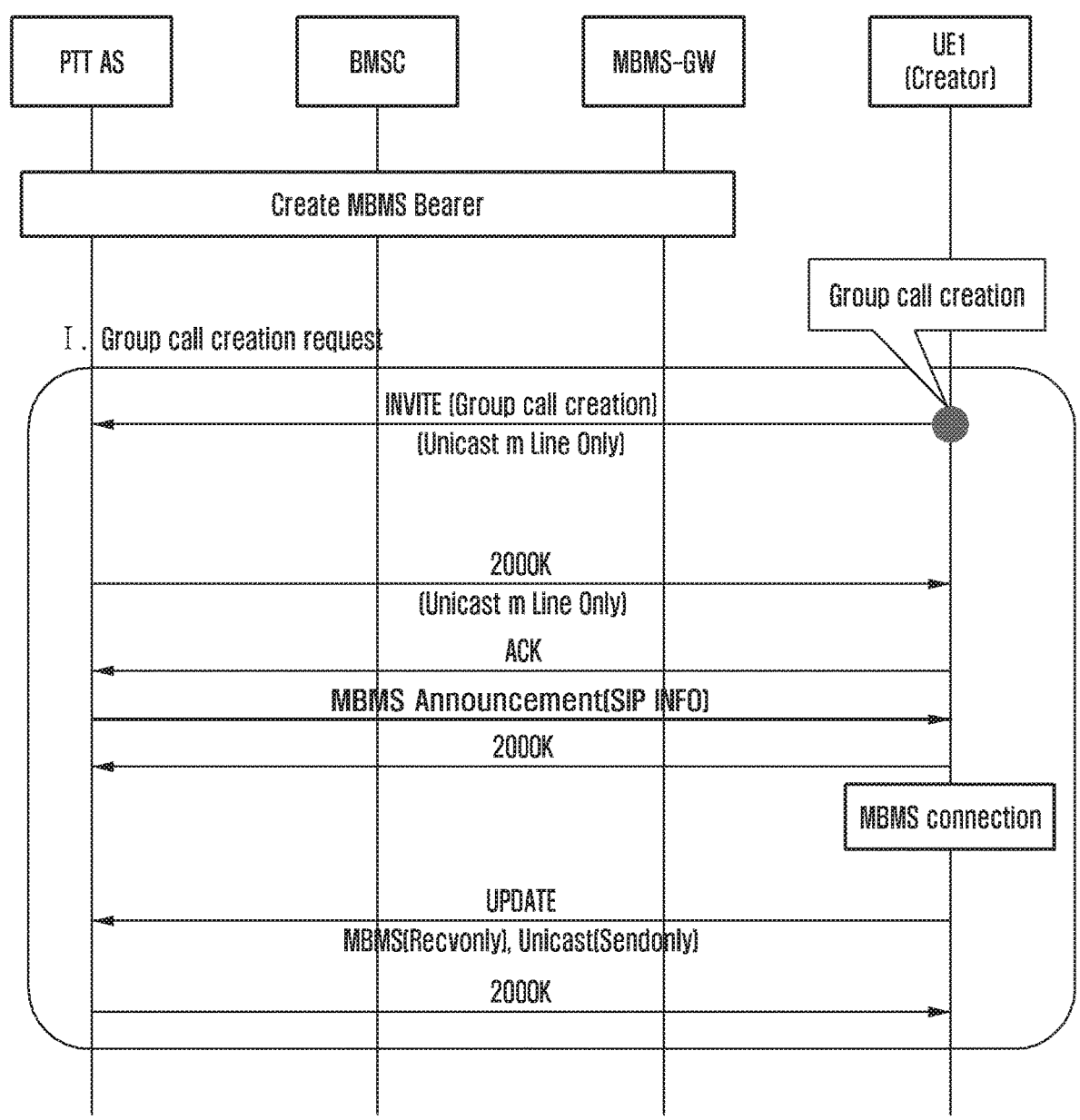
FIG. 18 is a diagram explaining a procedure in which a PTT server generates and transfers a DRX parameter, being limited to a public safety network call, to a terminal in the form of a session description protocol (SDP) of a session initiation protocol (SIP) as a session of an eMBMS between a terminal, a base station, and an MCE starts according to an embodiment of the present disclosure.

FIG. 18 is a diagram explaining a procedure in which a PTT server generates and transfers a DRX parameter, being limited to a public safety network call, to a terminal in the form of an SDP of a session initiation protocol (SIP) as a session of an eMBMS between a terminal, a base station, and an MCE starts according to an embodiment of the present disclosure.

Referring to FIG. 18, the DRX parameter is transferred to the PTT application of the terminal in the form of an MBMS Announcement (SIP INFO) message. The SIP info message that is required for transfer of the DRX parameter is as follows.

a=drx-inactivityTimer-r13: n1, n2, n3, n4, n5, n6, n7, n8
a=short-duration-timer-r13: n2, n4, n8
a=long-duration-timer-r13: n16, n32, n64
a=short-dray-cycle-timer-r13; n2, n4, n8, n16, n32

While the present disclosure has been shown and described with reference to various embodiments thereof, it will be understood by those skilled in the art that that various changes in form and details may be made therein without departing from the spirit and scope of the present disclosure as defined by the appended claims and their equivalents.

What is claimed is:

1. A method performed by a base station in a communication system, the method comprising:
identifying discontinuous reception (DRX) parameters that are used for transmission of data associated with a multimedia broadcast multicast service (MBMS);
transmitting, to a plurality of terminals on a multicast control channel (MCCH), control information including the DRX parameters, the DRX parameters including a DRX-inactivity timer and a duration timer for a multicast channel;
identifying whether there are packets to be transmitted to the plurality of terminals; and
transmitting, to the plurality of terminals, in case that there are the packets to be transmitted, the packets associated with the MBMS based on the DRX parameters.

2. The method of claim 1, wherein the packets include voice packets.

3. The method of claim 1, wherein transmitting the packets comprises:
storing the packets in a buffer; and
transmitting the packets stored in the buffer on resources allocated to the plurality of terminals.

4. A method performed by a terminal in a mobile communication system, the method comprising:
receiving, from a base station on a multicast control channel (MCCH), control information including discontinuous reception (DRX) parameters that are used for transmission of data associated with a multimedia broadcast multicast service (MBMS), the DRX parameters including a DRX-inactivity timer and a duration timer for a multicast channel;
identifying the DRX parameters; and
receiving, from the base station, packets associated with the MBMS based on the DRX parameters.

5. The method of claim 4,
wherein the packets include voice packets.

6. A base station in a communication system, the base station comprising:
a transceiver; and
a controller coupled with the transceiver and configured to:
identify discontinuous reception (DRX) parameters that are used for transmission of data associated with a multimedia broadcast multicast service (MBMS),
transmit to a plurality of terminals on a multicast control channel (MCCH), control information including the DRX parameters, the DRX parameters including a DRX-inactivity timer; and a duration timer for a multicast channel,
identify whether there are packets to be transmitted to the plurality of terminals, and
transmit, to the plurality of terminals, in case that there are the packets to be transmitted, the packets associated with the MBMS based on the DRX parameters.

7. The base station of claim 6, wherein the packets include voice packets.

8. The base station of claim 6, wherein the controller is further configured to:
  store the packets in a buffer, and
  transmit the packets stored in the buffer on resources allocated to the plurality of terminals.

9. A terminal in a communication system, the terminal comprising:
  a transceiver; and
  a controller coupled with the transceiver and configured to:
    receive, from a base station on a multicast control channel (MCCH), control information including discontinuous reception (DRX) parameters that are used for transmission of data associated with a multimedia broadcast multicast service (MBMS), the DRX parameters including a DRX-inactivity timer; and a duration timer for a multicast channel,
    identify the DRX parameters, and
    receive from the base station, packets associated with the MBMS based on the DRX parameters.

10. The terminal of claim 9, wherein the packets include voice packets.

\* \* \* \* \*